US012283874B2

(12) United States Patent
Antunes Cezario et al.

(10) Patent No.: US 12,283,874 B2
(45) Date of Patent: Apr. 22, 2025

(54) HEAT SINK FOR ROTATING ELECTRIC MACHINE AND FREQUENCY INVERTER AND CORRESPONDING ROTATING ELECTRIC MACHINE

(71) Applicant: WEG EQUIPAMENTOS ELETRICOS S.A., Jaraguá do Sul (BR)

(72) Inventors: Cassiano Antunes Cezario, Jaraguá do Sul (BR); Marcelo Verardi, Joinville (BR); Rafael Lopes, Jaraguá do Sul (BR); Ricardo Felipe Junckes, Jaraguá do Sul (BR)

(73) Assignee: WEG EQUIPAMENTOS ELETRICOS S.A., Jaraguá do Sul (BR)

( * ) Notice: Subject to any disclaimer, the term of this patent is extended or adjusted under 35 U.S.C. 154(b) by 297 days.

(21) Appl. No.: 17/597,386

(22) PCT Filed: Jul. 15, 2019

(86) PCT No.: PCT/BR2019/050272
§ 371 (c)(1),
(2) Date: Jan. 4, 2022

(87) PCT Pub. No.: WO2021/007628
PCT Pub. Date: Jan. 21, 2021

(65) Prior Publication Data
US 2022/0247276 A1 Aug. 4, 2022

(51) Int. Cl.
*H02K 9/22* (2006.01)
*H02K 5/04* (2006.01)

(52) U.S. Cl.
CPC .............. *H02K 9/227* (2021.01); *H02K 5/04* (2013.01); *H02K 9/22* (2013.01)

(58) Field of Classification Search
CPC ........ H02K 11/30; H02K 11/33; H02K 11/38; H02K 5/04; H02K 5/18; H02K 5/22;
(Continued)

(56) References Cited

U.S. PATENT DOCUMENTS 6,472,785 B2   10/2002   Petit et al.
6,832,488 B2 * 12/2004   Yokozeki ................ F04C 28/08
                                                                                 62/236

(Continued)

FOREIGN PATENT DOCUMENTS

CN   107482826 A  * 12/2017  .............. H02K 5/06
CN   108700091 A  * 10/2018  .............. F04D 25/08
(Continued)

OTHER PUBLICATIONS

Ojima et al, Fan Device, Oct. 23, 2018, CN 108700091 (English Machine Translation) (Year: 2018).*

(Continued)

*Primary Examiner* — Alexander A Singh
(74) *Attorney, Agent, or Firm* — Knobbe, Martens, Olson & Bear, LLP (57) ABSTRACT

The present invention refers to a heatsink (100) mounted between an electric motor (200) and a frequency inverter (300), comprising a plate (110) equipped with protrusions (120) that are cams of the plate (110) which project towards the deflector cover (210) of the motor (200).

12 Claims, 7 Drawing Sheets

(58) Field of Classification Search
CPC ........ H02K 2211/03; H02K 9/00; H02K 9/02; H02K 9/04; H02K 9/06; H02K 9/08; H02K 9/10; H02K 9/12; H02K 9/14; H02K 9/16; H02K 9/18; H02K 9/22; H02K 9/223; H02K 9/225; H02K 9/227
USPC .......................... 310/68 R, 52, 53, 60 R, 64
See application file for complete search history.

(56) References Cited

U.S. PATENT DOCUMENTS

| | | | |
|---|---|---|---|
| 10,069,374 | B2 | 9/2018 | Maeda et al. |
| 2014/0062227 | A1 | 3/2014 | Lang et al. |
| 2014/0265664 | A1* | 9/2014 | Camilleri ................. H02K 9/06 310/59 |
| 2017/0288565 | A1* | 10/2017 | Bethke ................. H05K 7/1432 |
| 2018/0076693 | A1* | 3/2018 | Maschke ................ H02K 11/33 |
| 2019/0145302 | A1* | 5/2019 | Jung ........................ F01P 5/04 384/394 |

FOREIGN PATENT DOCUMENTS

| | | | |
|---|---|---|---|
| DE | 10361748 | A1 * | 7/2005 ............. H02K 11/33 |
| DE | 102015204025 | A1 * | 9/2016 |
| EP | 1544982 | B1 | 3/2010 |

OTHER PUBLICATIONS

Frohlich et al, Electric Machine With A Heat Sink, Sep. 8, 2016, DE 102015204025 (English Machine Translation) (Year: 2016).*
Rausch et al, Compact Drive Consisting of Electric Motor, Jul. 21, 2005, DE 10361748 (English Machine Translation) (Year: 2005).*
Xu Jian, A Shock-proof Aluminum Shell, Dec. 15, 2017, CN 107482826 (English Machine Translation) (Year: 2017).*
International Search Report, regarding International Application No. PCT/BR2019/050272, mailed Feb. 17, 2020, 2 pages.

* cited by examiner

HEAT SINK FOR ROTATING ELECTRIC MACHINE AND FREQUENCY INVERTER AND CORRESPONDING ROTATING ELECTRIC MACHINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention belongs to the field of rotating electrical machines, in particular to arrangements for chilling and/or ventilation and/or refrigeration and to structural associations of rotating electrical machines with control and monitoring devices such as frequency inverters.

Description of the Related Art

Rotating electrical machines are equipment used to transform electrical energy into mechanical energy, in the case of motors, and vice versa, in the case of generators.

Frequency inverters are electronic devices used to vary the rotation speed of three-phase or single-phase induction electric motors, transforming fixed alternating electric current (current and voltage) into variable alternating electric current, controlling the power consumed by the load by varying the frequency delivered over the network.

In order to obtain more compact constructions, some types of frequency inverters are directly integrated into the motor, especially in its upper-posterior region, which, although reducing the assembly dimensions, influences the thermal features of the electrical machine and inverter assembly, since the latter involves part of its casing, interfering with the air flow generated by the electric machine refrigeration system. Therefore, it is necessary to optimize the heatsink of the frequency inverter, which is mechanically fixed to the motor casing, in order to obtain the best use of the electric machine refrigeration system, causing the dissipation of losses from the electronic components to be sufficiently conducted through a minimal air flow in the heat exchanger and in the motor. Therefore, they will remain in operation within the temperature limits throughout the entire operating range.

In the current prior art, there are several solutions that seek to optimize the thermal exchanges of electric motors with frequency inverters coupled to them in an integrated manner.

An example is the German patent document number DE 103 61 748 A1 which discloses and describes a compact drive, equipped with an electric motor with its own fan and an adjacent casing, axially disposed on the fan side, for accommodating electronic elements. The casing is connected to the motor through a connecting element and has a cooling body equipped with refrigeration fins. The fan is surrounded by a cooling fairing disposed between the electric motor and the casing, in such a way that the air drawn in by the fan passes through the refrigeration fins towards an air outlet, and is then blown over the refrigeration fins of the electric motor.

The first apparent disadvantage of the DE 103 61 748 A1 cooling body is the disposition of its fins which, despite being built extending radially and symmetrically from the outside to the inside, are disposed parallel to each other, which obviously restricts the air flow to the channels or corridors formed between the fins, which, because they are continuous or one-piece, also end up constituting barriers that limit air circulation and also prevent the air flow generated by turbulence in the vicinity of the fan from being used in the cooling of the motor and casing assembly, limiting the cooling assembly capacity. The air entry profile formed from these corridors between fins restricts air entry, increasing load loss and reducing heatsink efficiency. Furthermore, it decreases the air velocity along the electric motor, negatively affecting this part of the arrangement as well.

The heatsink fixation system described in DE 103 61 748 A1 does not allow mounting in other sizes of electric motor casings, making different components necessary for different sizes of electrical machines.

Another disadvantage of the compact drive disclosed by DE 103 61 748 A1 is the complexity of connecting the casing to the electrical motor terminal box, which makes a subsequent installation difficult in existing motors.

As can be inferred from the above description, there is space and demand for a heatsink solution for rotating electrical machine and frequency inverter assemblies that overcomes the disadvantages of the prior art, in particular for a thermally optimized heatsink that enables high power density, reduces the assembly dimensions, and facilitates the integration of inverters to motors already in field operation.

SUMMARY OF THE INVENTION

One of the objectives of the present invention is, therefore, to provide a heatsink according to the features of claim 1 of the attached set of claims.

Another objective of the present invention is to provide a corresponding rotating electrical machine according to the features of claim 6 of the attached set of claims.

Other features and feature details are represented by the dependent claims.

BRIEF DESCRIPTION OF THE DRAWINGS

For better understanding and visualization of the object of the present invention, the same will now be described with reference to the attached figures, representing the technical effect obtained by means of an exemplary embodiment not limiting the scope of the present invention, wherein, schematically.

DETAILED DESCRIPTION OF THE PREFERRED EMBODIMENT

The present invention refers to a heatsink (100) mounted between an electric motor (200) and a frequency inverter (300).

It should be noted that the term frequency inverter (300), according to the invention, refers to any equipment or device and its respective housing or frame, fixed to an electric motor (200).

The heatsink (100) is formed by a plate (110) equipped with intermittent or non-continuous protrusions (120) that form individual masses and surfaces for thermal dissipation, being disposed preferentially, but not necessarily equidistantly in an optimized profile, in order not to restrict the air entry of the assembly, dimensioned in order to optimize the thermal exchange of the electronic plate components (311) with greater heat generation.

The protrusions (120) must be disposed, preferably but not necessarily, in the regions with the highest heat emission from the electric motor (200), which can be detected, for example, in tests from the analysis of the air drainage along the plate (110), for different spacing, diameter and height, which help to determine the best configuration for disposition of the protrusions (120).

The protrusions (120) can have the same constructions, shapes, and dimensions on the same plate (110), but they can also have different constructions and/or shapes and/or dimensions, and therefore more than one type of protrusion (120) may exist.

In a non-limiting embodiment of the invention, the protrusions (120) have the same construction, shape, and dimensions, that is, all the protrusions (120) on a same plate (110) are the same.

In another non-limiting embodiment of the invention, the protrusions (120) have the same construction and shape, but different dimensions, and there may be protrusions of a second size (130), protrusions of a third size (135) to protrusions of an nth size (n), depending on the design demand, the existence, for example, of points of greater heat generation and that demand larger protrusions (130), in addition to protrusions capable of giving the heatsink (100) additional technical features, as well as serving to perform additional tasks, such as, for example, third-size protrusions (135) that can serve both as larger heatsinks and as a stop that ensures the maintenance of the ideal distance between the heatsink (100) and the deflector cover (210) of the motor (200) for better air flow in the other protrusions, without significant reduction in motor cooling (200).

In yet another non-limiting embodiment of the invention, the protrusions (120) have different construction, shape and dimensions, and therefore, there may also be, (in addition to the already described protrusions of a second size (130), protrusions of a third size (135) to protrusions of an nth size (n)) protrusions of a second type (136), of a third type (not shown) to protrusions of an nth type (nt), depending on the design demand, there may be protrusions of a second type (136), capable of serving as housing or expansion of space for housing of specific components, such as, but not limited to, capacitors, rectifiers, printed circuit plates and the like and, therefore, being able to take the most diverse constructive forms, such as circular cylindrical, troncoconical or any other geometrically adequate form, but always respecting the features of a protrusion according to the invention. The presence and the number of these second type protrusions (136), if any, will obviously depend on the intended application and design.

In any case, the protrusions (120) can be hollow or solid or a combination of hollow and solid variants, of circular, ellipsoid or even polygonal cross-section. The protrusions (120) that resulted in better dissipation rates were hollow, of circular cross section and a diameter that decreases as they move away from the plate (110).

In simulations and practical tests, for cases of protrusions of more than one size, the proportion between the protrusions (120) and the protrusions of a second size (130) varies according to the application and the thermal load to be dissipated, however should be such that the second size protrusion (130) is 1.5 to 2.5 times, preferably 1.8 times taller (or longer) than the protrusion (120).

Each protrusion (120), therefore, has a top diameter (121) and a base diameter (122), the relationship between them being such that the top diameter (121) represents between 70 and 95% of the base diameter (122), preferably 86%. The same applies to the second size (130), third size (135) and nth size (n) protrusions, remembering that there may still be protrusions of a second type (136), of a third type up to an nth type (nt) and so on, according to the needs of each design.

Starting from the base of the plate (110) having a plate thickness (123), each protrusion (120) has an exposed height (124) and an overall height (125), where the total height (125) is the sum of the plate thickness (123) and exposed height (124). The ratio is such that the exposed height (124) is two to four times, preferably 2.8 times greater than the plate thickness (123). The same applies to the second size (130) and third size (135) protrusions and other protrusion sizes.

The construction of the protrusion (120) when hollow is such that its top thickness (126) is equal to its body thickness (127), that is, its protrusion thickness (126, 127) is uniform. The protrusion thickness (126, 127) is 20 to 50%, preferably 36% of the plate thickness (123). The same applies preferably to the other protrusions, when in their hollow version.

In the case of massive protrusions, the above considerations apply in relation to their external dimensions.

It should be noted that the thermal exchange efficiency is greater the greater the exposed height (124) and diameters (121,122) and the smaller the plate (123) and protrusion (126, 127) thicknesses. However, the limits for these values are given by the application conditions, motor size (200), frequency inverter size (300), assembly thermodynamics, construction space, sizing limitations, materials, manufacturing method or process, conformation etc.

Finally, the protrusions (120) are disposed on the plate (110) so that, together, they occupy between 40 and 90% of the total dissipation surface of the plate (110).

The number of protrusions (120) represents, on average, between 50% and 100%, preferably 86% of the sum of all protrusions of the total dissipation surface of the plate (110).

The number of second size protrusions (130), if any, represents, on average, between 5 and 20%, preferably 11% of the sum of all protrusions of the total dissipation surface of the plate (110).

The protrusions (120) when hollow, solid or in a mixed configuration, in addition to reducing the mass of the heatsink (100), improve thermal exchange by increasing the area of the internal and external surface. They also enable the variation in the position of the heatsink (100) without impacting the thermal exchange, providing interchangeability between casings (201), that is, it allows its use in motors (200) of different sizes.

The ideal distance between the heatsink (100) and the deflector cover (210) of the motor (200) is 10 to 35% of the air entry diameter of the deflector cover (210).

Due to the air suction generated by the blower (220) of the motor ventilation system (200), the air drainage is forced to pass between the plate (110), the protrusions (120) and the deflector cover (210) at considerable speeds, which reduces the temperature of the plate (110) and of the frequency inverter (300), in addition to allowing to increase the power density of the frequency inverter (300).

Positioning the frequency inverter (300) on the rear of the motor (200) allows you to take advantage of the suction air speed of the motor ventilation system (200) to also refrigerate the frequency inverter (300). This enables reducing the volume of aluminum in the frequency inverter (300) allowing the use of polymeric materials, reducing the mass and, consequently, the costs of the product.

The heatsink (100) of the frequency inverter (300) is mounted on a base (140) that supports the entire assembly and is responsible for the connection between the motor (200) and the frequency inverter (300). This base (140) is fixed by screws on the heatsink (100) where it has housings (500) that do not require machining of any of the components for fixation. This base (140) has side flaps (141) that involve part of the motor (200) in order to increase the air speed in the heatsink (100) and support structural efforts related to the assembly application.

This base (140) is mounted on an intermediate support (150) that allows the fixation of the frequency inverter (300) to different casing sizes (201) of the motor (200), and also allows mounting on motors (200) which are being used by customers already in field operation.

An exemplary frequency inverter (300) for the present invention can be, but is not limited to, of the type that has two covers (310, 320), one rear (310) and one upper (320). The rear cover (310) is responsible for protecting and accessing the electronic plate (311) where the motor (200) is powered. The upper cover (320) gives access to the place where the connections between the motor and frequency inverter cables (300) are made, in addition to functioning as a support for the HMI (Human Machine Interface) module (700).

Finally, it should be noted that the distribution of the protrusions (120) on the surface of the plate (110) depends on a number of factors, but, in particular, on the identified thermal profile and the desired dissipation for each application, depending on the design.

Figure 1:
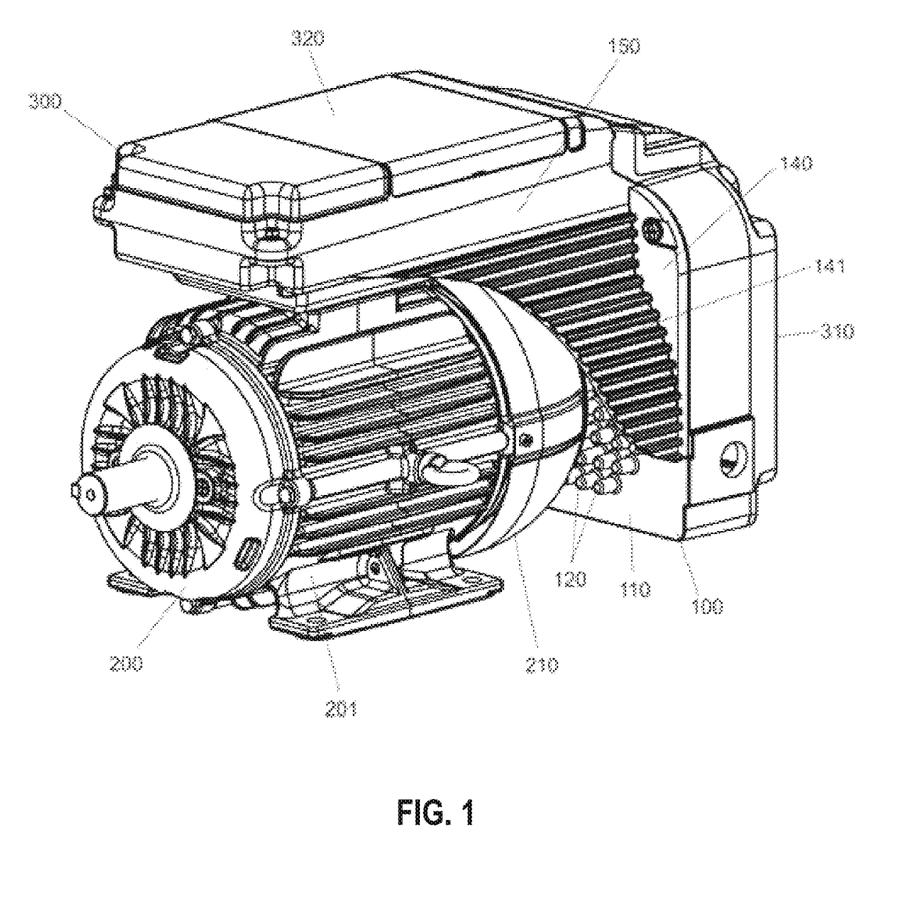
FIG. 1 shows an anterolateral perspective view of a rotating electrical machine and frequency inverter assembly equipped with a heatsink according to the invention.
Figure 2:
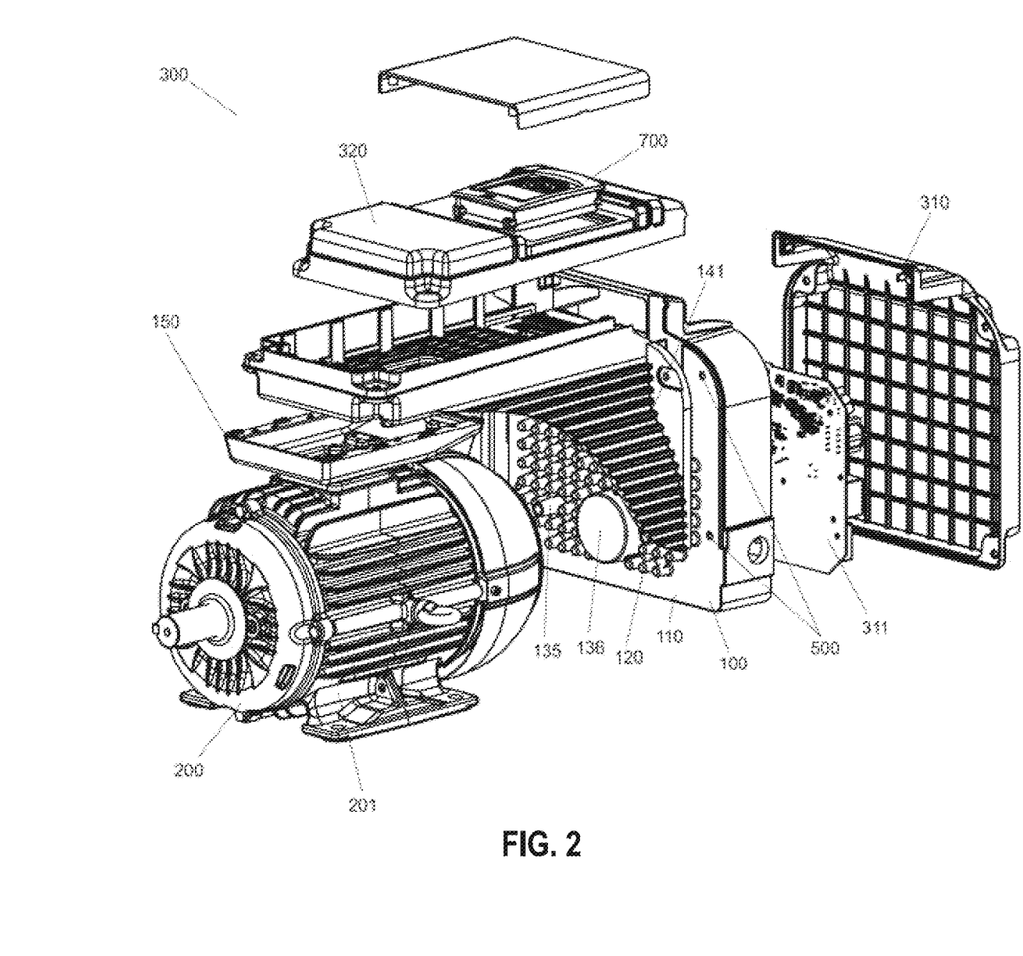
FIG. 2 shows an exploded view in anterolateral perspective of the assembly of FIG. 1.
Figure 3:
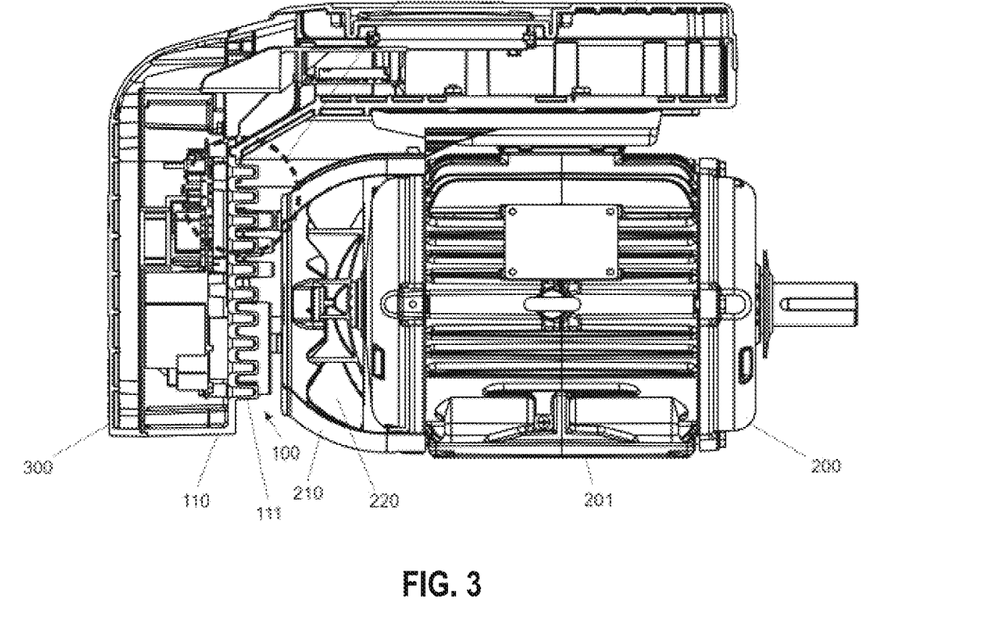
FIG. 3 shows a side view in partial section of the assembly of FIG. 1.
Figure 4:
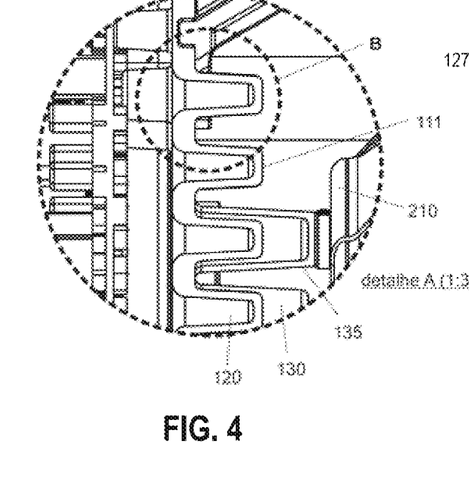
FIG. 4 shows an enlarged side view of detail A of FIG. 3.
Figure 5:
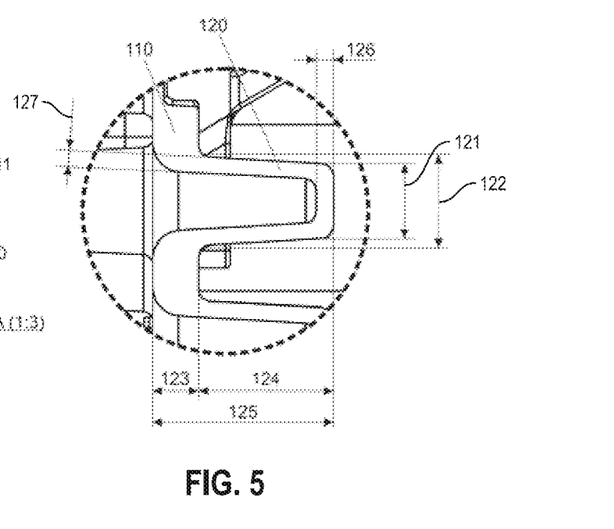
FIG. 5 shows an enlarged side view of detail B of FIG. 4.
Figure 6:
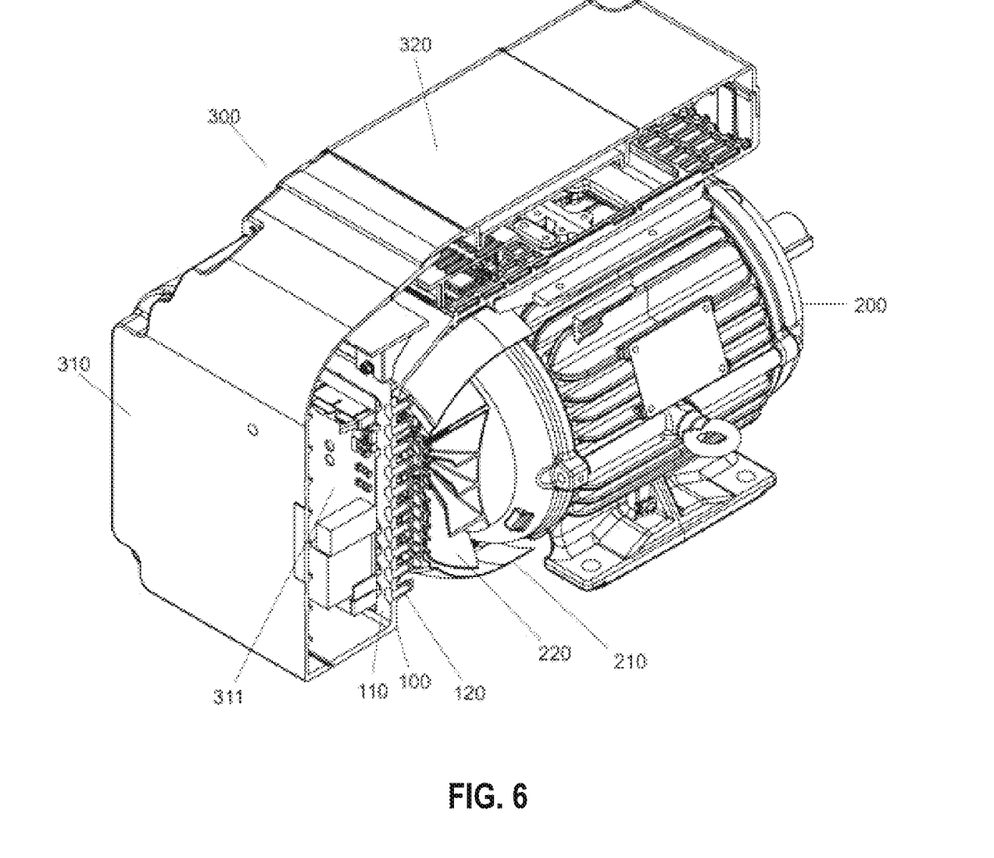
FIG. 6 shows a posterolateral perspective view of the assembly of FIG. 1.
Figure 7:
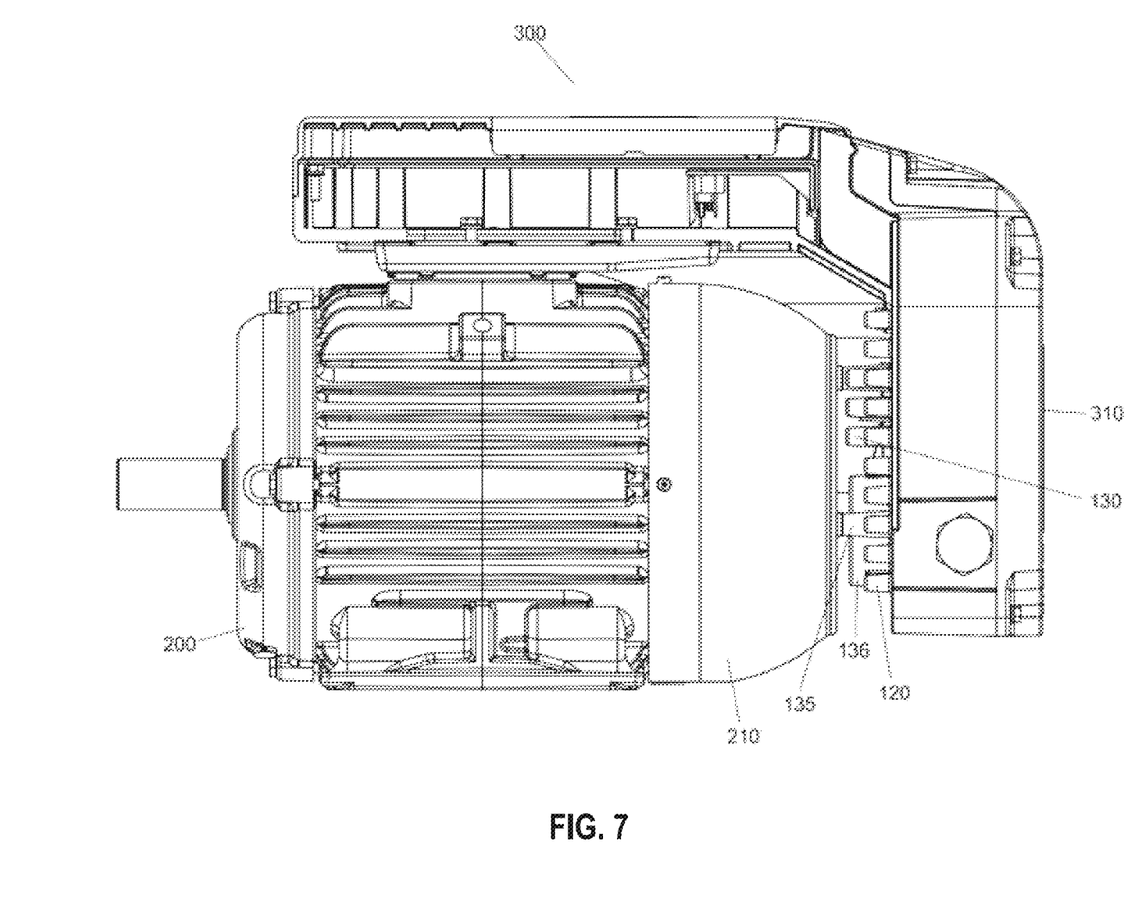
FIG. 7 shows a side view of the assembly of FIG. 1.
Figure 8:
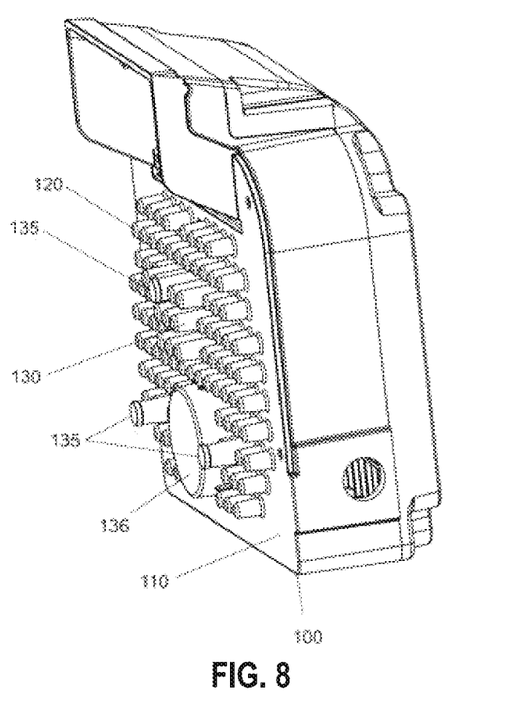
FIG. 8 shows a partial view in perspective of the rear part of the assembly of FIG. 1.
Figure 9:
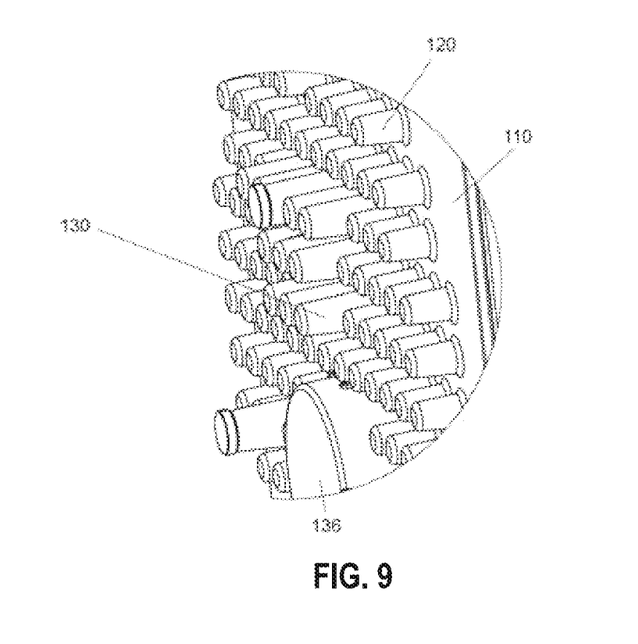
FIG. 9 shows an enlarged detail view of the protrusions and stops of FIG. 8.
Figure 10:
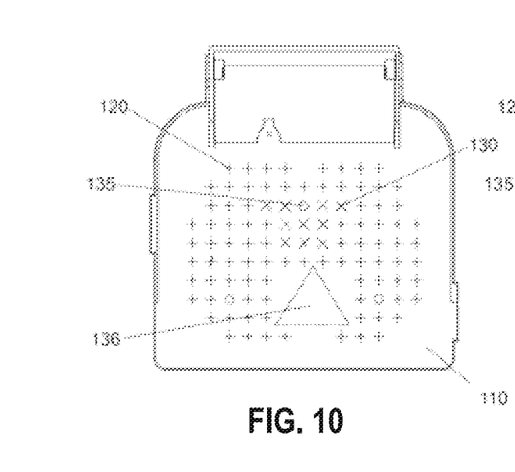
FIG. 10 shows a front view of a plate equipped with protrusions according to the invention in polygonal distribution.
Figure 11:
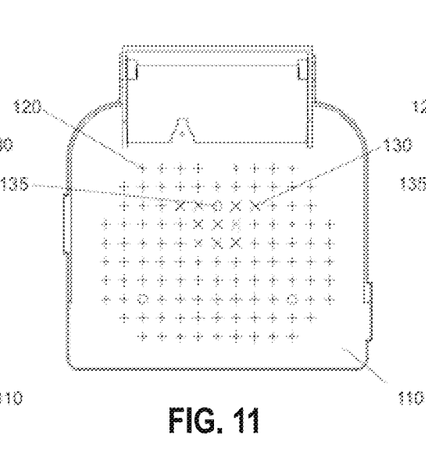
FIG. 11 shows a front view of a plate equipped with protrusions according to the invention in polygonal distribution.
Figure 12:
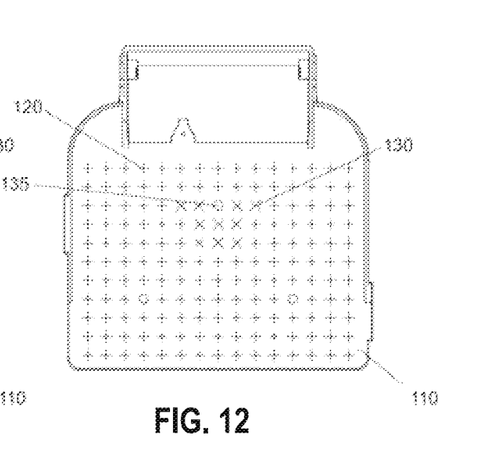
FIG. 12 shows a front view of a plate equipped with protrusions according to the invention in polygonal distribution.
Figure 13:
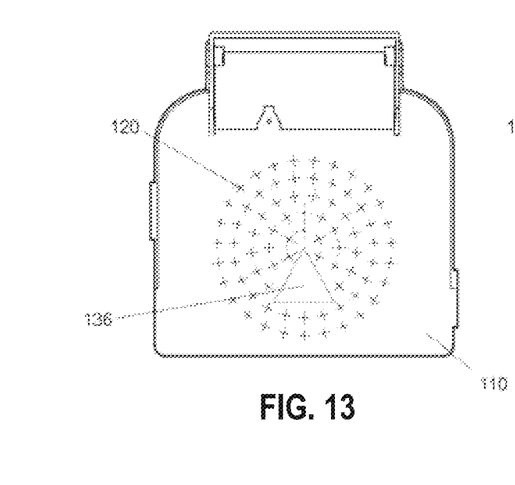
FIG. 13 shows a front view of a plate equipped with protrusions according to the invention in circular distribution.
Figure 14:
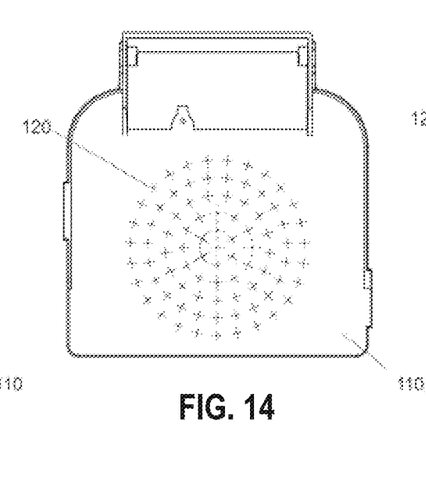
FIG. 14 shows a front view of a plate equipped with protrusions according to the invention in circular distribution.
Figure 15:
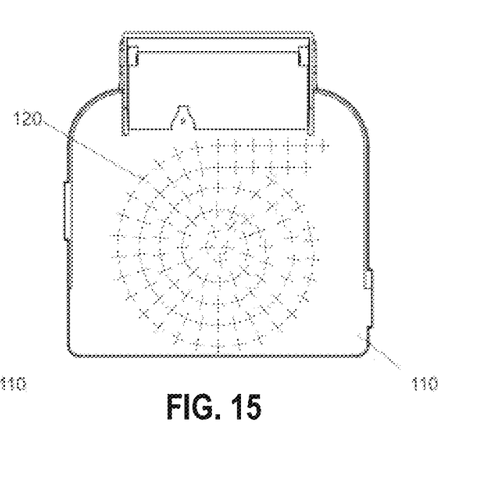
FIG. 15 shows a front view of a plate equipped with protrusions according to the invention in spiral distribution.

This distribution can follow a polygonal pattern as represented by FIGS. 10, 11 and 12, or a circular pattern as represented by FIGS. 13 and 14, or even a spiral pattern as represented by FIG. 15, or even a combination of one or more of these patterns, remembering that the protrusions (120) can have the same constructions, shapes and dimensions on the same plate (110), but they can also have different constructions and/or shapes and/or dimensions, therefore there may be more than one type of protrusion, each one always intermittent or non-continuous, which form individual masses and surfaces for thermal dissipation.

CONCLUSION

It will be easily understood by those skilled in the art that changes can be made to the present invention without departing from the concepts exposed in the above description. These modifications must be regarded as encompassed in the scope of the present invention. Consequently, the particular embodiments detailed above are only illustrative and exemplary and are non-limiting as to the scope of the present invention, to which the full extent of the attached set of claims must be observed, and any and all correspondents thereof.

What is claimed is:

1. A heatsink for a rotating electrical machine and frequency inverter assembly, the heatsink mounted on a rear portion of a base that supports the inverter assembly, the rear portion of the base positioned between an electric motor and a frequency inverter at least partially positioned on the rear of the electric motor, the base comprising an upper portion positioned above the electric motor, the heatsink comprising: a plate equipped with intermittent or non-continuous protrusions, which are cams of the plate that project towards a deflector cover of the electric motor, wherein the heatsink is externally coupled to the electric motor, and wherein the upper portion of the base is mounted on the electric motor with an intermediate support coupled to a top of the electric motor, wherein the protrusions are hollow protrusions, and
wherein the plate comprises at least a first protrusion type and a second protrusion type, wherein the first protrusion type comprises at least a different size, shape, or construction from the second protrusion type.

2. The heatsink of claim 1, wherein the protrusions have a circular or ellipsoidal or polygonal cross section and a diameter or larger diagonal dimension that decreases as they move away from the plate.

3. The heatsink of claim 1, wherein the protrusions occupy between 40 and 90% of a total dissipation surface of the plate.

4. The heatsink of claim 1, wherein the protrusions are disposed equidistantly on the plate.

5. The heat sink of claim 1, wherein the plate further comprises a third protrusion type, wherein the third protrusion type comprises at least a different size, shape, or construction from the first protrusion type and the second protrusion type.

6. The heat sink of claim 1, wherein the upper portion extends from the rear portion in a direction parallel to the protrusions of the heat sink.

7. A rotating electric machine, comprising:
a heatsink mounted on a rear portion of a base that supports the rotating electric machine, the rear portion of the base positioned between an electric motor and a rear portion of a frequency inverter, the rear portion of the frequency inverter positioned on a rear of the electric motor, the base comprising an upper portion positioned above the electric motor and between the electric motor and an upper portion of the frequency inverter, the heat sink comprising a plate with intermittent or non-continuous protrusions on a surface of the plate, the protrusions being cams of the plate that project towards a deflector cover of the electric motor, wherein the heatsink is externally coupled to the electric motor, and wherein the upper portion of the base is mounted on the electric motor with an intermediate support coupled to a top of the electric motor, wherein the protrusions are hollow protrusions, and wherein the plate comprises at least a first protrusion type and a second protrusion type, wherein the first protrusion type comprises at least a different size, shape, or construction from the second protrusion type.

8. The rotating electric machine of claim 7, wherein the protrusions have a circular or ellipsoidal or polygonal cross section and a diameter or larger diagonal dimension that decreases as they move away from the plate.

9. The rotating electric machine of claim 7, wherein the protrusions occupy between 40 and 90% of a total dissipation surface of the plate.

10. The rotating electric machine of claim 7, wherein the protrusions are disposed equidistantly on the plate.

11. The rotating electric machine of claim 7, wherein the plate further comprises a third protrusion type, wherein the third protrusion type comprises at least a different size, shape, or construction from the first protrusion type and the second protrusion type.

12. The rotating electric machine of claim 7, wherein the upper portion of the base extends from the rear portion of the base in a direction parallel to the protrusions of the heat sink.

* * * * *